Figure 1:
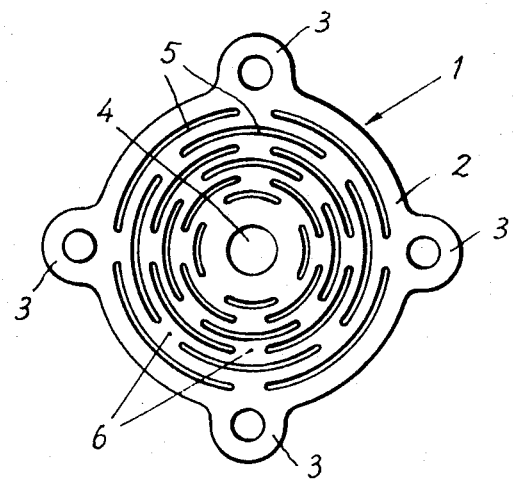

United States Patent

[11] 3,586,131

| [72] | Inventor | Noel Le Mire<br>Billancourt, France |
|---|---|---|
| [21] | Appl. No. | 805,634 |
| [22] | Filed | Mar. 10, 1969 |
| [45] | Patented | June 22, 1971 |
| [73] | Assignees | Regie Nationale Des Usines Renault<br>Billancourt, ;<br>Automobiles Peugeot<br>Paris, France |
| [32] | Priority | Mar. 13, 1968 |
| [33] | | France |
| [31] | | 143568 |

[54] PLASTIC DEFORMATION-ABSORBING DEVICES
2 Claims, 2 Drawing Figs.

[52] U.S. Cl. .................................................. 188/1,
297/386
[51] Int. Cl. ....................................................... F16f 7/12
[50] Field of Search ............................................. 188/1 C;
248/358; 297/386

[56] References Cited
UNITED STATES PATENTS

| 3,198,288 | 8/1965 | Presunka ..................... | 188/1 (C) |
| 3,444,962 | 5/1969 | Lech ............................. | 188/1 (C) |
| 3,486,395 | 12/1969 | Yoshioka ..................... | 188/1 (C)X |

*Primary Examiner*—Duane A. Reger
*Attorney*—Stevens, Davis, Miller & Mosher

ABSTRACT: Mechanical energy absorbing device permitting absorbing a thrust by the plastic deformation of a member, characterized in that it comprises a metal plate having a central fastening point and a plurality of lateral-fastening points, said metal plate being so apertured that it can expand when subjected to a certain effort tending to move said central fastening point away from at least one of said lateral-fastening points.

PATENTED JUN 22 1971 3,586,131

INVENTOR
NOËL LEMIRE
By Stevens, Davis, Miller & Mosher
ATTORNEYS

PLASTIC DEFORMATION-ABSORBING DEVICES

The present invention relates to a device adapted to absorb mechanical energy by plastic deformation, which is applicable wherever the need for such device arises, notably for securing or coupling automotive parts likely to be moved or struck by the passengers of a vehicle in case of crash, accident or fierce brake application.

Various types of mechanical energy-absorbing devices are already known which operate by plastic deformation and are mounted on the steering column, the seat-fastening or retaining means, the bumper mounting, etc... All these known devices involve the combination of a number of elements and therefore their shapes correspond to substantial volumetric proportions which make them cumbersome. Moreover, their cost is relatively high.

It is the chief object of the present invention to avoid these inconveniences by providing a plastic deformation energy-absorbing device which is particularly simple in design, of reduced volumetric proportions and therefore of very small overall dimensions, and adapted to be mass-produced at a vary low cost.

The mechanical energy-absorbing device permitting damping a thrust by the plastic deformation of a member according to this invention consists of a metal plate comprising a central fastening point and a plurality of lateral fastening points, said metal plate being so apertured that it can expand when subjected to a certain force tending to move the aforesaid central fastening point away from at least one of said lateral-fastening points.

According to a specific form of embodiment of this invention the aforesaid metal plate comprises a plurality of arcuate slots disposed around the center of the plate and grouped into successive series from the center towards the outer periphery of the plate, the slots of each series being shifted angularly in relation to those of the next series.

Figure 2:
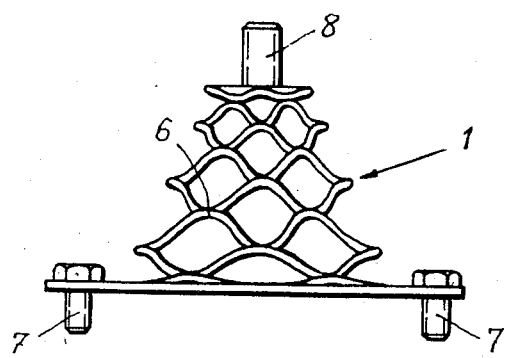

Other features of this invention will appear as the following description proceeds with reference to the attached drawing given by way of example and wherein:

FIG. 1 is a plan view from above of the energy-absorbing device according to this invention, and FIG. 2 is a side elevational view of the same device but in its expanded condition.

In the specific form of embodiment of the energy-absorbing device illustrated in the drawing, this device 1 comprises a metal plate 2 of substantially circular configuration, which is formed with four integral fastening lugs 3 disposed at spaced intervals on its outer periphery, and a central-fastening orifice 4.

Arcuate slots 5 are formed through the plate 2 around the center thereof. These slots 5 constitute concentrical series or groups of four slots each. Considering the fact that these series are disposed sequentially and concentrically from the center to the outer peripheral edge of the plate, the slots 5 of each series are gradually shorter from the center outwards and angularly shifted from one series to another. By virtue of this shifted arrangement the plate 2 comprises distortion bridges 6 located between the slots of a same series.

Of course, the nature of the metal of plate 2, as well as its thickness, the number of slots 5 per series, the length and width of these slots, and the number and relative spacing of the series of slots will be calculated as a function of the amount of mechanical energy which the device is expected to absorb in operation.

The above-described energy-absorbing device is secured on the one hand in the fashion of a flange to a support (not shown) by means of the peripheral fastening lugs 3 receiving bolts 7 therethrough, and on the other hand to the vehicle element (not shown) to be mounted or fastened to said support, by means of another bolt 8 extending through the central orifice 4.

Thus, in case of effort tending to modify the relative position of the support and of the element fastened thereto, notably in case of shock, crash, etc... the plate will undergo a plastic deformation for example as shown in FIG. 2, thus absorbing a substantial fraction of the energy produced during said shock.

Of course, this invention is also concerned with all possible variations and modifications of the device described and shown herein, which will readily occur to those skilled in the art.

Thus, for instance, the slots described and illustrated herein may be replaced by incipient-fracture notches or thinner portions so disposed and dimensioned that the plate deformation can take place in the manner illustrated in FIG. 2, i.e. so that the central-fastening point constantly remains connected to the lateral-fastening points by means of bridgelike plate portions.

I claim:

1. A mechanical energy-absorbing device permitting absorbing a thrust by plastic deformation comprising a metal plate having a central-fastening point and a plurality of lateral-fastening points disposed about the periphery of said plate, serially formed in said plate as a concentrically repeated pattern, the slots of one series being angularly shifted in relation to those of the adjacent series, whereby said plate can deform when subjected to a certain effort tending to displace said central-fastening point with respect to at least one of said lateral-fastening points.

2. A mechanical energy-absorbing device according to claim 1 wherein said slots are arcuate and said concentric pattern comprises circles of spaced slots.